(12) United States Patent
Endo

(10) Patent No.: US 7,929,047 B2
(45) Date of Patent: Apr. 19, 2011

(54) IMAGE TAKING APPARATUS

(75) Inventor: Hiroshi Endo, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 493 days.

(21) Appl. No.: 12/135,533

(22) Filed: Jun. 9, 2008

(65) Prior Publication Data
US 2009/0009636 A1    Jan. 8, 2009

(30) Foreign Application Priority Data
Jul. 2, 2007   (JP) ................................. 2007-174073

(51) Int. Cl.
H04N 5/222    (2006.01)
(52) U.S. Cl. .................. 348/370; 348/371; 348/208.4; 348/208.6; 348/208.12; 348/208.1
(58) Field of Classification Search .................. 348/370, 348/371, 208.4, 208.1, 208.6, 208.12
See application file for complete search history.

(56) References Cited

U.S. PATENT DOCUMENTS

| | | | | |
|---|---|---|---|---|
| 7,432,953 | B2 * | 10/2008 | Washisu | 348/208.5 |
| 7,486,884 | B2 * | 2/2009 | Okuno et al. | 396/155 |
| 7,630,015 | B2 * | 12/2009 | Okamura | 348/371 |
| 2003/0184671 | A1 * | 10/2003 | Robins et al. | 348/362 |
| 2005/0057662 | A1 * | 3/2005 | Washisu | 348/208.99 |
| 2006/0198625 | A1 * | 9/2006 | Okuno et al. | 396/155 |
| 2007/0047936 | A1 * | 3/2007 | Hirota | 396/55 |
| 2007/0263119 | A1 * | 11/2007 | Shum et al. | 348/371 |
| 2008/0152336 | A1 * | 6/2008 | Hara et al. | 396/311 |

FOREIGN PATENT DOCUMENTS

| | | |
|---|---|---|
| JP | 11-252445 A | 9/1999 |
| JP | 2000-341577 A | 12/2000 |
| JP | 2003-304443 A | 10/2003 |
| JP | 2005-130159 A | 5/2005 |
| JP | 2007-036978 A | 2/2007 |
| JP | 2007-049374 A | 2/2007 |

* cited by examiner

*Primary Examiner* — David L Ometz
*Assistant Examiner* — Antoinette T Spinks
(74) *Attorney, Agent, or Firm* — Sughrue Mion, PLLC

(57) ABSTRACT

When a release button is pressed in the image adding mode and flash-on mode, a system control section instructs a timing generation section to continuously supply a timing signal to an imaging section, thereby causing the imaging section to perform high speed continuous shooting. A flash is caused to emit light in sync with taking the last one of images taken by the continuous shooting such that the amount of the emitted light results in underexposure for one image. The continuous images taken by the imaging section are sequentially output via a preprocessing section to a blurring correction section where the taken images are superimposed upon each other to obtain an image of appropriate exposure in which blurring has been corrected.

10 Claims, 11 Drawing Sheets

US 7,929,047 B2

IMAGE TAKING APPARATUS

FIELD OF THE INVENTION

The present invention relates to an image taking apparatus that has an imaging device and generates a picture signal by forming a subject image on the imaging device.

BACKGROUND ART

Many of recent digital cameras are equipped with a camera shake correction function. Configurations for realizing this camera shake correction function can be classified into an electronic type and an optic type. The optic type compensates camera shake by moving a lens and an imaging device, while the electronic type compensates camera shake by superimposing plural images taken by continuous shooting so as to align the images. The electronic type has been incapable of compensating blurring of images occurred within 1/30 second because the conventional frame rate of most imaging devices is 30 frames per second. However, such a defect is overcome now by using the imaging device having high-speed frame rate of 1.2 mega 300 frames per second that has been developed by Sony Corporation.

When an electronic type of camera shake correction is performed using such an imaging device of high speed frame rate, high speed continuous shooting is performed in one image taking operation and the motion vector of each of plural shot images are detected. Based on the detected motion vector, the shot images are superimposed upon each other to correct blurring. More specifically, as whole of the imaging area on the imaging device cannot be used, an area having a predetermined size smaller than the whole imaging area is set as a record area. On the record area, the shot images are superimposed upon each other so as to be aligned (see for example, Japanese Patent Application Publication Nos. 11-252445, 2000-341577, and 2005-130159). According to these techniques, an image of appropriate light amount can be obtained by superimposing plural shot images.

Incidentally, there has been proposed a technique in which a flash is emitted for one operation of continuous shooting, thereby taking an image brighter than an image without a flash (see, for example, Japanese Patent Application Publication Nos. 2007-36978, 2007-49374, and 2003-304443). More specifically, Japanese Patent Application Publication Nos. 2007-36978, and 2007-49374 propose the technique in which two images are taken in one operation of continuous shooting: the first image taken with a flash and the second image taken without a flash are superimposed so that an image that has appropriate exposure and is brighter than an image taken without a flash can be taken. In addition, Japanese Patent Application Publication No. 2003-304443 proposes the technique in which the difference in light amount between the images taken with and without a flash is obtained to correct irradiation distribution of the flash; image data only for the shot image with flash is created and subjected to correction for light unevenness so that distribution of light amount is made even over the whole of the image and the image with appropriate exposure can be obtained. The technique disclosed in Japanese Patent Application Publication Nos. 2007-36978, 2007-49374, and 2003-304443 is applied to slow synchronized image taking and the like. As camera shake is easily occurred in slow synchronized image taking, if the technique disclosed in Japanese Patent Application Publication Nos. 2007-36978 and 2007-49374 is combined with the technique of electronic camera shake function, an image that is corrected for camera shake and brighter than an image shot without a flash can be obtained. In addition, if the technique disclosed in Japanese Patent Application Publication No. 2003-304443 is combined with a technique with electronic camera shake function, it is possible to prevent a case in which the light amount on the perimeter of an image is decreased compared to that of the center of the image.

However, none of Japanese Patent Application Publication Nos. 2007-36978, 2007-49374, and 2003-304443 describes details as to how to adjust the light amount of a flash in order to obtain an image with appropriate exposure.

SUMMARY OF THE INVENTION

In view of the above circumstances, the present invention provides an image taking apparatus that is capable of obtaining an image of appropriate exposure in which blurring at the time of shooting with a flash is electronically corrected.

An image taking apparatus according to the present invention for forming a subject on an imaging device and thereby generating an image representing the subject, the image taking apparatus includes:

a flash that emits light, amount of which can be changed, to the subject at the time of shooting;

a blurring correction section that superimposes a plurality of continuous images taken by one shooting operation and thereby generates one superimposed image in which blurring has been corrected;

an image recording section that records the superimposed image generated by the blurring correction section; and a flash control section that causes the flash to emit light in sync with taking one image of the plurality of continuous images that are to be taken by one shooting operation, the light having such a light amount that results in underexposure of the taken one image.

When blurring is corrected electronically as mentioned above, the plural images are superimposed upon each other by the blurring correction section, and the light amount of the plural images are added for the number of the plural images. Thus, an image of the appropriate exposure can be obtained. However, overexposure may occur in a case where light is emitted in a dark scene to gain sufficient exposure.

According to the image taking apparatus of the present invention, the flash control section causes the flash to emit light, in sync with taking one image of the plurality images, having such a light amount that results in underexposure of the taken one image. Thus, when the plural images are superimposed by the blurring correction section, an image of appropriate exposure can be obtained.

Here, it is preferable to have a number of images setting section that sets the number of images taken by one shooting operation, wherein the flash control section causes the flash to emit light in sync with taking one image of the plurality of continuous images that are taken by one shooting operation, the light having a smaller light amount as the number of images taken by one shooting operation is larger.

The above feature enables the flash control section to adjust the light amount according to the number of images set in the number of images setting section. Superposing the images produces an image of appropriate exposure.

Also preferably, the flash control section causes the flash to emit light in sync with taking the last image of the plurality of continuous images that are to be taken by one shooting operation.

If light is emitted in sync with taking the first image, a subject may move as the subject is likely to consider the light as a sign of completion of shooting. However, if light is emitted in sync with taking the last image, the light can be used as a sign for notifying the subject of completion of shooting as the subject can visually recognize the light.

Further, it is preferable to have a motion vector calculating section that calculates a motion vector based on the plurality of continuous images taken by one shooting operation, wherein the blurring correction section superimposes the plurality of continuous images so that blurring is corrected based on the motion vector calculated by the motion vector calculating section. In addition, it is preferable to have an angular velocity sensor that detects the angular velocity of the image taking apparatus, wherein the blurring correction section superimposes the plurality of continuous images taken by one shooting operation so that blurring is corrected based on the angular velocity detected by the angular velocity sensor.

Further preferably, the image recording section records the superimposed image generated by the blurring correction section, by attaching to the superimposed image the amount of light that has been emitted in sync with taking one of images based on which the superimposed image is generated.

Above features enables the user to confirm on the display the amount of light at the time of reproduction while watching the shot image that is brighter than usual.

As described above, it is possible to realize an image taking apparatus that is capable of obtaining an image of appropriate exposure in which blurring at the time of shooting with a flash is corrected electronically.

DETAILED DESCRIPTION OF THE INVENTION

Figure 1:
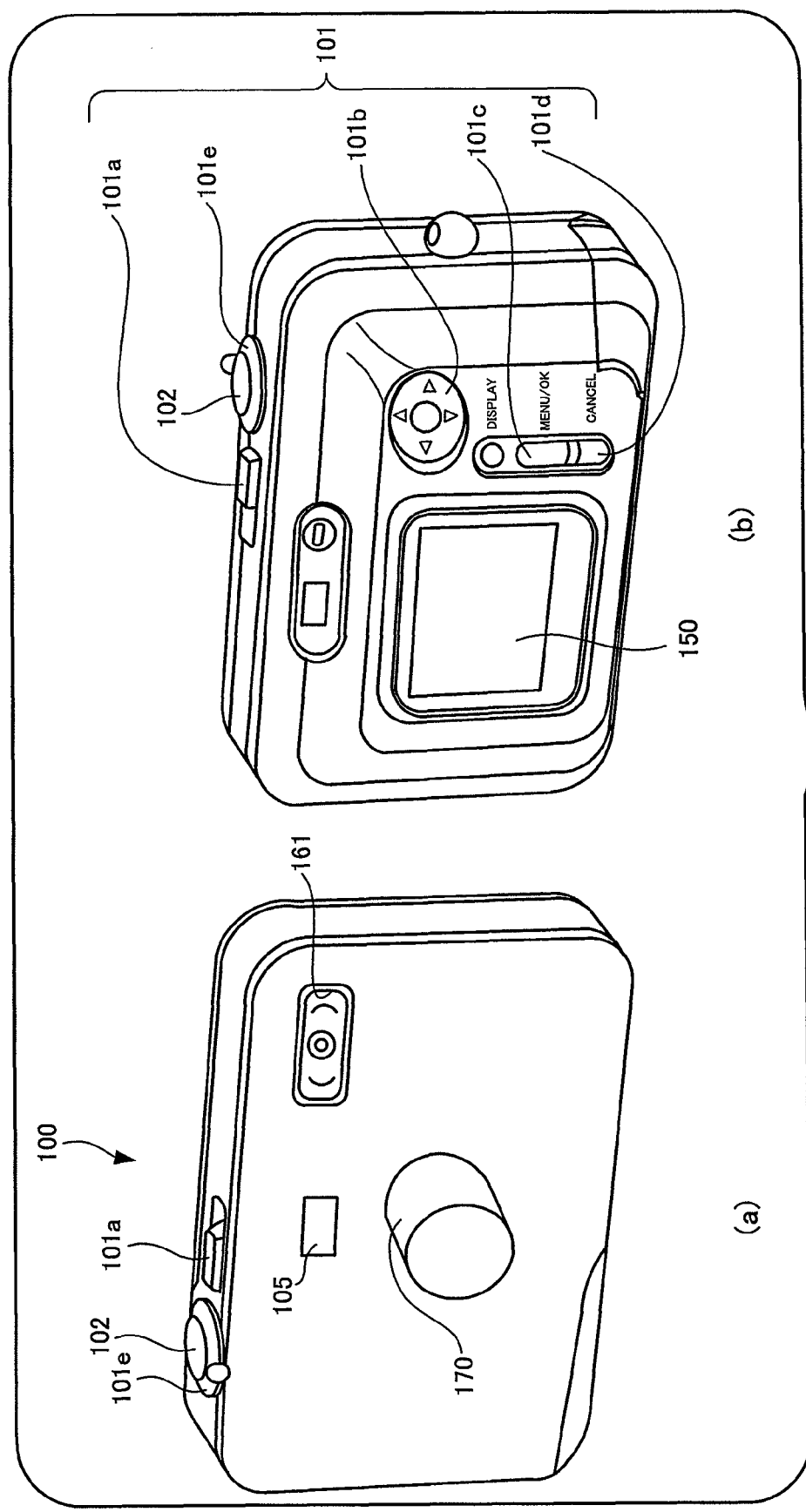
FIG. 1 is a diagram showing a digital camera which is one embodiment of the image taking apparatus of the present invention.

FIG. 1 shows a perspective diagram of a digital camera 100 which is one embodiment of the present invention. Part (a) of FIG. 1 shows the front of the digital camera 100 obliquely viewed from above and part (b) of the FIG. 1 shows the back of the digital camera 100 obliquely viewed from above.

As shown in part (a) of FIG. 1, a lens barrel 170 is disposed in the middle of the body of the digital camera 100 of the present embodiment. A finder 105 is disposed above the lens barrel 170. Also, a photographic auxiliary light emission window 161 is disposed beside the finder 105. It should be noted that the digital camera 100 of the present embodiment has a flash incorporated therein that emits light toward a subject through the photographic auxiliary light emission window 161 and a flash-on mode and a flash-off mode for determining whether flash is used for shooting, which will be described later in detail. In addition, the digital camera 100 of the present embodiment is equipped with an image adding mode as a shooting mode. When the image adding mode is set, one operation of high speed continuous shooting is performed and the plural shot images are superimposed by the camera shake correction section (which will be described later), thereby obtaining a superimposed image of appropriate exposure in which blurring has been corrected.

Also, as shown in part (b) of FIG. 1, on a top face and a back face of the digital camera 100 of the present embodiment, a group of operation members 101 are disposed to be handled by a user for performing various operations using the digital camera 100. The operation members 101 include a cross key 101b, a menu/OK key 101c, a cancel key 101d, a mode lever 101e other than a power switch 101a to operate the digital camera 100. The mode lever 101e of the operation members 101 switches between a playback mode and a shooting mode, and further switches between a moving image mode and a still image mode in the shooting mode. When the power switch 101a is turned on with the mode lever 101e switched to the shooting mode, a moving image (hereafter called as a through image as an image caught by an imaging lens is passed through to be displayed on a LCD 150) is displayed on the LCD 150. When a user pushes a release button 102 at timing for a good shot while watching the through image, operation of shooting an image of a subject is performed. It should be noted that the menu/OK key 101c and the cross key 101b are used to set either of the flash-on mode and the flash-off mode provided in the digital camera of the present embodiment. The digital camera 100 of the present embodiment has the camera shake correcting section (which will be described later) to correct blurring electronically. When the image adding mode is set, plural images are obtained by one shooting operation and are superimposed upon each other. Further, when the flash-on mode is set, flash light is emitted at the time of shooting one of the plural images to be superimposed. Thus, an image brighter than an image without flash is obtained. The detail will be described later.

Incidentally, when the mode lever 101e is switched to the playback mode, an existing captured image is reproduced on the LCD 150. In addition, the release button 102 provided in the digital camera 100 of the present embodiment has two operation modes of a halfway-push and an all-the-way push. Photometric measurement and distance measurement are carried out in response to halfway-push of the release button 102. Aperture and shutter speed are set according to the measured photometric value, and a focus lens is placed at a focus position according to the measured distance to the subject. Subsequently, in response to all-the-way push, a shutter is driven at the set shutter speed and exposure is performed on the imaging device. In addition, the digital camera of the present embodiment has two types of shutters of a mechanical shutter and an electronic shutter provided in the imaging device. The mechanical shutter is used when shutter speed is slow. On the other hand, when shutter speed is too fast to drive with the mechanical shutter, the electronic shutter is used. It should be noted that the mechanical shutter is desirable for shooting a still image to prevent smear or the like, while the electronic shutter is desirable for shooting a through image. Further, it should be noted that in the following descriptions, in order to distinguish a through image for a finder from a shot image, the shot image which is obtained by all-the-way pushing operation of the release button 102 is referred to as a main image relative to a through image.

Figure 2:
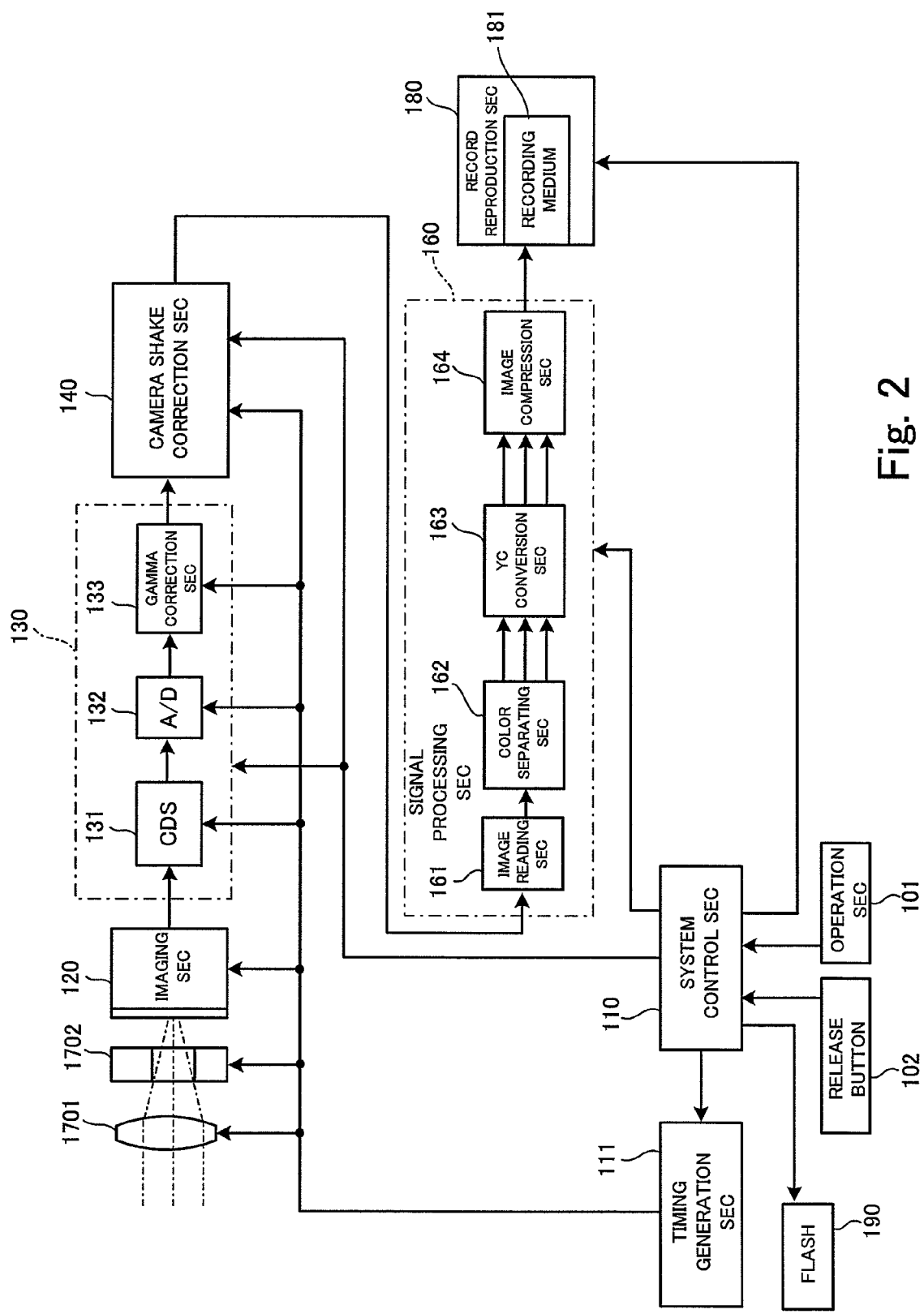
FIG. 2 is a block diagram showing a configuration of an electric system in the digital camera of FIG. 1.

FIG. 2 is a block diagram showing a configuration of the electric system in the digital camera 100 of FIG. 1.

Referring to FIG. 2, the configuration of the digital camera 100 and its operation are briefly described.

The digital camera 100 of FIG. 2 has an optical lens system 1701, a timing generation section 111, a system control section 110, a diaphragm adjusting mechanism 1702, an imaging section 120, a preprocessing section 130, a camera shake correcting section 140, a signal processing section 160, a record reproducing section 180, and a flash 190. In addition, the digital camera 100 is also equipped with the mechanical shutter, which is not so important in the subject matter of the present invention and thus omitted in the drawing.

From now on, the configuration of each section described above will be described.

The optical lens system 1701 is formed by, for example, combination of plural optical lenses such as a focus lens and a zoom lens. The Optical lens system 1701 includes a zoom mechanism that adjusts a position of a zoom lens in the optical lens system to adjust a focal length and an AF (Automatic Focus) adjusting mechanism that adjusts a position of a focus lens in the optical lens system to adjust focus. Both mechanisms are driven according to a driving signal generated in the timing generation section 111.

The timing generation section 111 has a built-in transmitter that produces a system clock of the digital camera 100. Further, the timing generation section 111 includes a timing signal generation section that generates a timing signal in synch with the system clock and a driving signal section that generates a driving signal in sync with the system clock. In response to supply of a control signal from the system control section 110, the timing signal generation section 111 outputs, according to the control signal, a timing signal to the imaging section 130, the preprocessing section 140, and further to the driving signal generation section in the timing signal generation section 111. In response to the timing signal, the driving signal generation section in the timing signal generation section 111 outputs a driving signal to the flash as well as the zooming and AF adjusting mechanisms described above.

The system control section 110 that supplies a control signal to the timing generation section 111 is equipped with, for example, a CPU (Central Processing Unit) and a ROM in which operation procedure of the digital camera 100 is written. The system control section 110 generates a control signal for controlling operation of each section, based on information supplied from the operation members 101 and the release button 102 in accordance with a user's operation and information from the ROM. The generated signal is then supplied to the timing generation section 111, the preprocessing section 130, the camera shake correcting section 140, the signal processing section 160, the record reproducing section 180, the flash 190 and the like. The control signal supplied to the flash 190 represents the amount of light to be emitted from the flash 190.

The diaphragm adjusting mechanism 1702 that is disposed behind the optical lens system 1701, adjusts an area of incident light flux cross section (i.e., diaphragm opening area) to supply the optimum light flux to the imaging device in shooting an image of a subject. A driving signal is supplied to the diaphragm adjusting mechanism 1702 from the timing generation section 111. Although not shown in the figure, the driving signal is based on diaphragm and exposure time that is calculated by the system control section 110 after AE (Automatic Exposure) processing is performed based on an electric charge of a signal subjected to photoelectric conversion in the imaging section 120. The system control section 110 supplies the control signal based on the diaphragm and exposure time to the timing generation section 111, thereby causing the driving signal generation section in the timing generation section 111 to generate a driving signal.

In addition, the imaging section 120 has a photoelectric converting imaging device that is placed so as to be perpendicular to an optical axis of the optical lens system. At the incident side of the imaging device, color filters that separate colors corresponding to respective photoelectric transducers are arranged two dimensionally. Depending on a timing signal from the timing generation section 111, photoelectric conversion is performed in the imaging device. The photoelectric conversion generates a signal charge, which is output to the preprocessing section 130 in a predetermined timing, e.g., off timing of the electronic shutter. When the digital camera of FIG. 1 is set to the shooting mode, the imaging device decreases the number of pixels to start shooting for a through image. Further, when the release button is pressed fully (all the way) while shooting, shooting of a through image is stopped to start shooting of a main image to be recorded. The imaging device in FIG. 2 has the high-speed frame rate as described above. Although the details will be described later, when the release button 102 is pressed all the way in the image adding mode, fast continuous shooting of plural images is performed in one shooting operation. The plural shot images are superimposed by the camera shake correction section 140, so that blurring can be electronically corrected and the main image of appropriate exposure can be obtained. Further, in the flash-on mode, light is emitted at the time of shooting one of the plural images so that the main image whose blurring is corrected and which is brighter than an image shot without a flash can be obtained.

In the following descriptions, images obtained by high speed continuous shooting are referred to as continuous shot images. Further, continuous shot images are called by the number of times of shooting. For example, continuous shot images at the first shooting is referred to as a first image of continuous shooting, and the one at the second shooting is referred to as a second image of continuous shooting. When high-speed continuous shooting is performed for the set number of times, plural shot images are superimposed to correct blurring electronically and an image of appropriate exposure is obtained.

In addition, the preprocessing section 130 includes a CDS (Correlated Double Sampling) 131 provided with a clamping circuit and a sample-hold circuit, an A/D 132 and a gamma correction section 133. When the CCD solid-state imaging device is used in the imaging section 120, various noise generated due to operation of the CCD solid-state imaging device is removed in the clamping circuit and sample-hold circuit by a timing signal from the timing generation section 111.

A signal charge whose noise is removed is changed to color signals (R,G,B) exactly corresponding to the received light amount to be supplied to the A/D section 132 of the subsequent stage where the color signals are quantized at a predetermined quantized level and converted into digital signals. At this time, conversion into a digital signal is performed according to the timing signal from the timing generation section 111.

More particularly, the gamma correcting section 133 has a look-up table for gamma correction where digital signals subjected to gamma correction performed corresponding to the digital signal input in the look-up table are output and the color signals converted into digital signals are supplied to the camera shake correcting section 140.

Here, referring to FIG. 3, the configuration of the camera shake correcting section 140 will be described.

Figure 3:
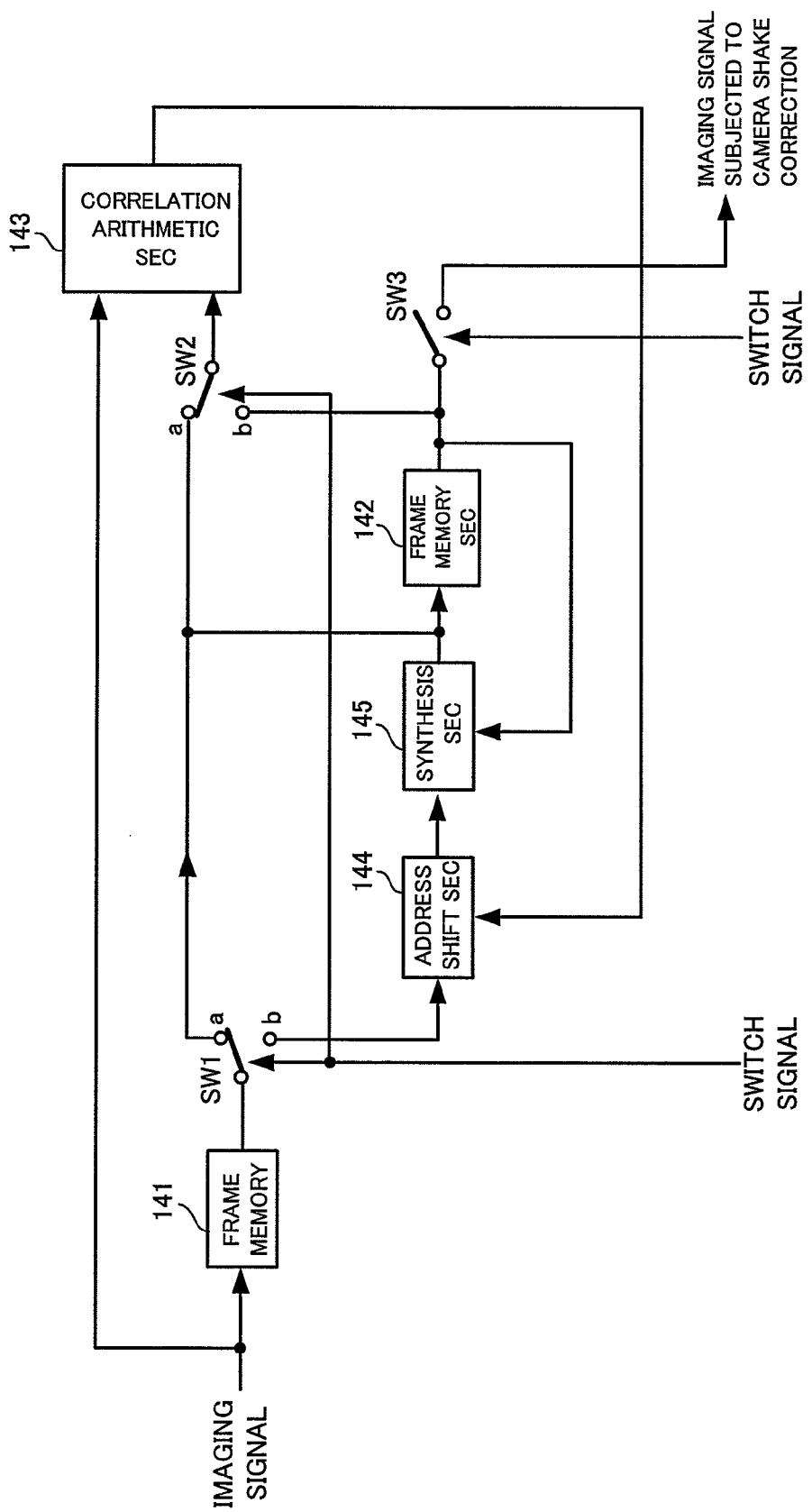
FIG. 3 is a diagram showing the configuration of a camera shake correcting section.

FIG. 3 is a diagram showing the configuration of camera shake correcting section 140.

The camera shake correcting section 140 shown in FIG. 3 has a frame memory 141, a frame memory section 142, a correlation arithmetic section 143, an address shift section 144, a synthesis section 145 and three switches SW1-SW3. In this particular example, memory used in the frame memory 141, and the frame memory section 142 has a size capable of storing color signals of R, G, and B for one frame, and is non-destructive and repeatedly readable.

Referring to FIG. 3, the configuration of the camera shake correcting section 140 is sequentially described from an incident side.

At first, operation of the camera shake correcting section 140 in the case of a through image is described.

In the case of a through image, the imaging section 120 outputs picture signals representing a through image every 1/30 second (or 1/60 second) by dropping the pixel number of the imaging device. The picture signals, after subjected to preprocessing in the preprocessing section 130, are supplied to the signal processing section 160 through the camera shake correcting section 140.

In the signal processing section 160, the picture signals representing the through image are subjected to color separation, and YC transform processing, and then are supplied to an image display section (not shown) to display the through image on the LCD 150 (see FIG. 1).

If the release button 102 is pressed while a through image is displayed in the image adding mode, the system control section 110 causes the imaging section 120 to start high speed continuous shooting by instructing the timing generation section 111 to continuously supply timing signals for the number of shots. If the flash-on mode is set, the system control section 110 causes the timing generation section 111 to supply a timing signal for shooting the last image of the continuous images to the flash 190 as well as the imaging section, so that the flash 190 emits light at the time of shooting the last image. As described above, the flash 190, in response to a control signal from the system control section 110, emits light based on information represented by the control signal indicating the light amount that results in underexposure for one image, so that the superimposed images generate an image of appropriate exposure that is brighter than an image without a flash.

In this way, the system control section 110 causes the timing generation section 111 to supply timing signals in succession, and thereby causes the imaging section 120 to perform continuous shooting in sync with each timing signal, making the preprocessing section 130 to sequentially output continuous shot images. The preprocessing section 130 receives continuous shot images each of which is subjected to the conversion to digital signals and sequentially output to the camera shake correcting section 140.

In the camera shake correcting section 140 shown in FIG. 3, electronic blurring correction is applied to the continuous shot images that are supplied from the preprocessing section 130 one after another. At first, the first and second images of the continuous shooting that is performed by one push of the release button 102 are taken, the first and second shot images are input to the correlation arithmetic section 143.

At this time, as both the switches SW1 and SW2 are turned to the side "a," the first shot image stored in the frame memory 141 is supplied to the frame memory section 142 as well as the correlation arithmetic section 143 via the switches SW1 and SW2 and stored in the correlation arithmetic section 143.

In the correlation arithmetic section 143 in which the first shot image and the second shot image are supplied, the motion vector indicating blurring is detected using the two images. If any motion vector is detected, both the switches SW1 and SW2 are turned to the side "b" under the control of the system control section 110. At the same time, location data (e.g., coordinate data x, y) indicating the detected motion vector is supplied to the address shift section 144. At this time, the content of the frame memory 141 is rewritten from the first shot image into the second shot image, and the second shot image in the frame memory 141 is supplied to the address shift section 144 via junction b of the switch SW1.

As the first shot image is stored in the frame memory section 142, the location of the second shot image is offset to overlap with the location of the first shot image in the frame memory section 142. In this way, the second shot image is added based on the first shot image to correct blurring. Thus, a superimposed image whose blurring is corrected is stored in the frame memory section 142.

Thereafter, the third shot image, the fourth image and so on are sequentially supplied to the correlation arithmetic section 143, based on the location of the first shot image in the frame memory section 142. In the correlation arithmetic section 143, the motion vector based on the third shot image and the fourth shot image is detected, so that blurring is corrected. In this way, a superimposed image obtained by adding each shot image is written over the existing image in the frame memory section 142.

After this routine of adding shot image is repeated for the number of images that are obtained by one operation of continuous shooting, the system control section 110 switches the switch SW3 to "disconnection" through a switch signal.

In response to the switching of the switch SW3, the superimposed image in the frame memory 142 is read by the image reading section 161 of the signal processing section 160. A record area having a fixed area ratio to the whole imaging area is set in the image reading section 161 by the system control section 110. An image having the fixed area ratio is cut out from the superposed image in the frame memory section 142 and read by the image reading section 161.

When the superimposed image is read by the signal processing section 160 shown in FIG. 2, color signals forming the image are selectively sorted out by the color separating section 162 in the signal processing section 160. At the same time, color signals of certain pixels are interpolated by color signals of pixels around the certain pixels. The color signals are changed to plain signals for each frame and are supplied to the YC conversion section 163 of the subsequent stage.

In the YC conversion section 163, YCC signals are generated by transformation matrix, and further supplied to the image compression section 164 where the YCC signals are compressed. An image file having the compressed YCC signals and the compressed information is recorded in the recording medium 181 by the record reproduction section 180. It should be noted that the record reproducing section 180 may read an image recorded in the recording medium 181 and the read image may be supplied to an image display section (not shown) to be displayed on the LCD 150.

With the above-described configuration, the system control section 110 instructs, in the image adding mode, the imaging section 120 to perform high speed continuous shooting by directing the timing generation section 111 to supply timing signals continuously to the imaging section 120, thereby causing the camera shake correcting section 140 to correct blurring. In addition, when the flash-on mode is also set, the system control section 110 directs the timing generation section 111 and flash 190 to emit, at the time of shooting the last image of the continuous images, light having such a light amount that results in underexposure for one image.

Therefore, in the image adding mode, an image of appropriate exposure can be obtained by superimposing plural images taken by one continuous shooting operation in the camera shake correcting section 140. Further, when the flash-on mode is also set, an image that has appropriate exposure and is brighter can be obtained by emitting light, in sync with shooting one of plural images, with such a light amount of light that results in underexposure for one image.

In the present embodiment, the camera shake correcting section 140 is one example of the blurring correction section according to the present invention. The combination of the system control section 110 and the timing generation section 111 is an example of the flash control section according to the present invention.

Here, descriptions will be made on the process of image taking operation performed by the system control section 110.

Figure 4:
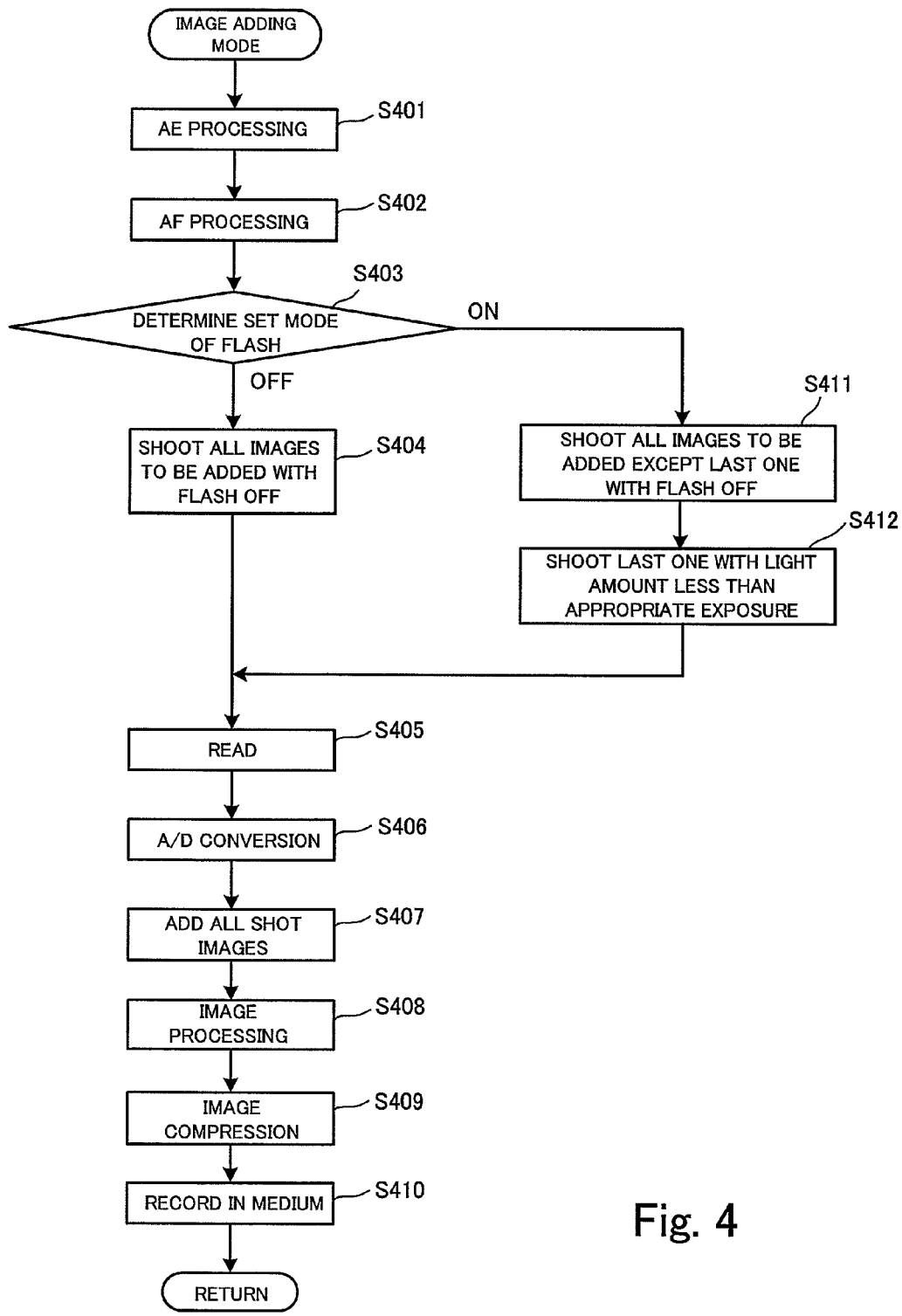
FIG. 4 is a flow chart showing a routine of an image taking process performed by a system control section.

FIG. 4 is a flow chart showing the process of image taking operation performed by the system control section 110. The system control section 110 starts the process in FIG. 4 when the release button 102 is pressed halfway with the mode lever 101e of the operation members 101 switched to the shooting mode in the image adding mode.

At first, the system control section 110 performs AE process in step S401 to calculate an f number and a shutter speed, and set the number of continuous images to be taken according to the calculated shutter speed in the timing generation section 111. In step S402, AF process is carried out to place a focus lens at a focal point. If the release button 102 is pressed all the way, the set mode of the flash is judged. If it is judged to be the flash-off mode in step S403, the system control section 110 makes the timing generation section 111 to continuously supply timing signals and thereby causes the imaging device provided in the imaging section 120 to start continuous shooting in step S404. In step S405, the system control section 110 causes the preprocessing section 130 to output an image including all pixels for each of continuous images; output images are processed by the CDS131 provided in the preprocessing section 130. In step S406, the images are subjected to A/D conversion; image data formed by color signals of digital signals is output from the camera shake correcting section 140. In step S407, images are superimposed by the camera shake correcting section 140. When the system control section 110 judges that shooting of the predetermined number of images is completed, it notifies the signal processing section 160 of completion, and changes the switch SW3 in the camera shake correcting section 140 from connection to disconnection. In step S408, the signal processing section 160 reads the superimposed image by cutting the image by the area ratio set in the process of step S401, and performs process of color separation and YCC conversion. In step S409, the superposed image is further subjected to compression process. If the system control section 110 detects that a series of processes are finished and the signal processing section 160 has renewed a process ending flag, the system control section 110 instructs, in step S410, the record reproducing section 180 to make an image file of the compressed information and compressed image and to record the file in the recording medium 181, which ends this flow.

On the other hand, if, in step S403, it was judged to be flash-on mode, it goes to step S411 where the continuous shooting is performed in flash-off mode for the number of images one less than the predetermined number of images. In step S412, the last image is taken by causing the flash 190 to emit light with light amount insufficient for one image. Thereafter, the process of step S405 to step S410 is performed to end the flow.

When the system control section 110 performs the process shown in FIG. 4 described above, in the flash-off mode, an image of appropriate exposure is obtained by the superimposing of the images by the camera shake correcting section 140. In the flash-on mode, an image of appropriate exposure that is brighter than an image without flash can be obtained, because the light amount of flash is adjusted to underexposure for one image.

As described above, blurring is corrected electronically in shooting with flash, and it is possible to realize the image taking apparatus that is capable of taking an image of the appropriate exposure.

Figure 5:
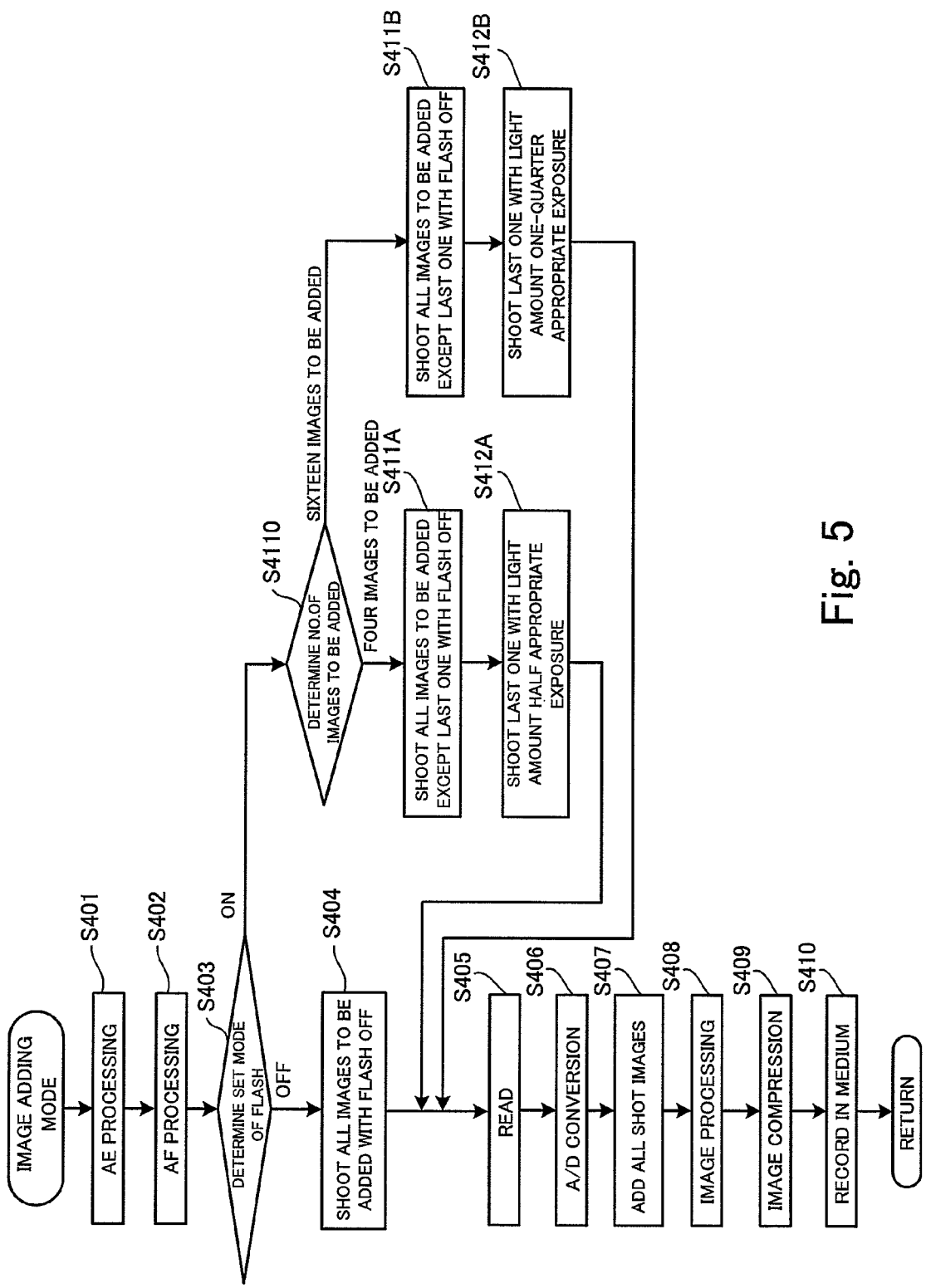
FIG. 5 is a diagram showing a second embodiment.

FIG. 5 is a diagram explaining a second embodiment.

In the first embodiment, the number of images to be shot is automatically set according to the shutter speed calculated by AE processing. However, the number of images may be set by the operation of the operation members 101 if the image adding mode is selected.

For example, it is conceivable that the number of images to be shot is selected between four and sixteen like the second embodiment. In the case of four, four images are shot and superimposed, which doubles the light amount, while in the case of sixteen, light amount is four-fold. Accordingly, as light amount is two-fold or four-fold according to the number of images, it is easy to adjust light amount at the time of emitting flash light.

It should be noted that the process of the flow in FIG. 5 is same as that of FIG. 4 except that steps S411 and S412 in FIG. 4 are replaced by steps S4110, S411A, S412A, S411B, and S412B in FIG. 5.

When the number of images is set to either of four and sixteen in response to operation and the release button 102 is pushed halfway, the process of the flow in FIG. 5 is started. The system control section 110 performs AE process in step S401, and AF process in step S402. When it is judged to be flash-on mode in step S403, it goes to step S4110 where it is judged whether the number of images is four or sixteen. If it is judged to be four, the shutter speed corresponding to four images is set in the timing generation section 111. In step S412A, three images are shot in the flash-off mode, and the last fourth image is shot by emitting light of light amount that results in underexposure for one image. Hereafter, the process from step S405 to step S410 is performed to finish the flow.

If it was judged to be sixteen in step S4110, the shutter speed corresponding to sixteen images is set, in step S411B, in the timing generation section 111. Subsequently, fifteen images are shot in the flash-off mode and the last sixteenth image is shot by emitting light of light amount that results in underexposure in one image, in step S412B. Hereafter, the process from step S405 to S410 is performed to finish the flow.

When the system control section 110 performs the process of the flow shown in FIG. 5, a shutter speed is set according to the number of images to be shot (added) and the images are superimposed so that an image of appropriate exposure is surely obtained.

Figure 6:
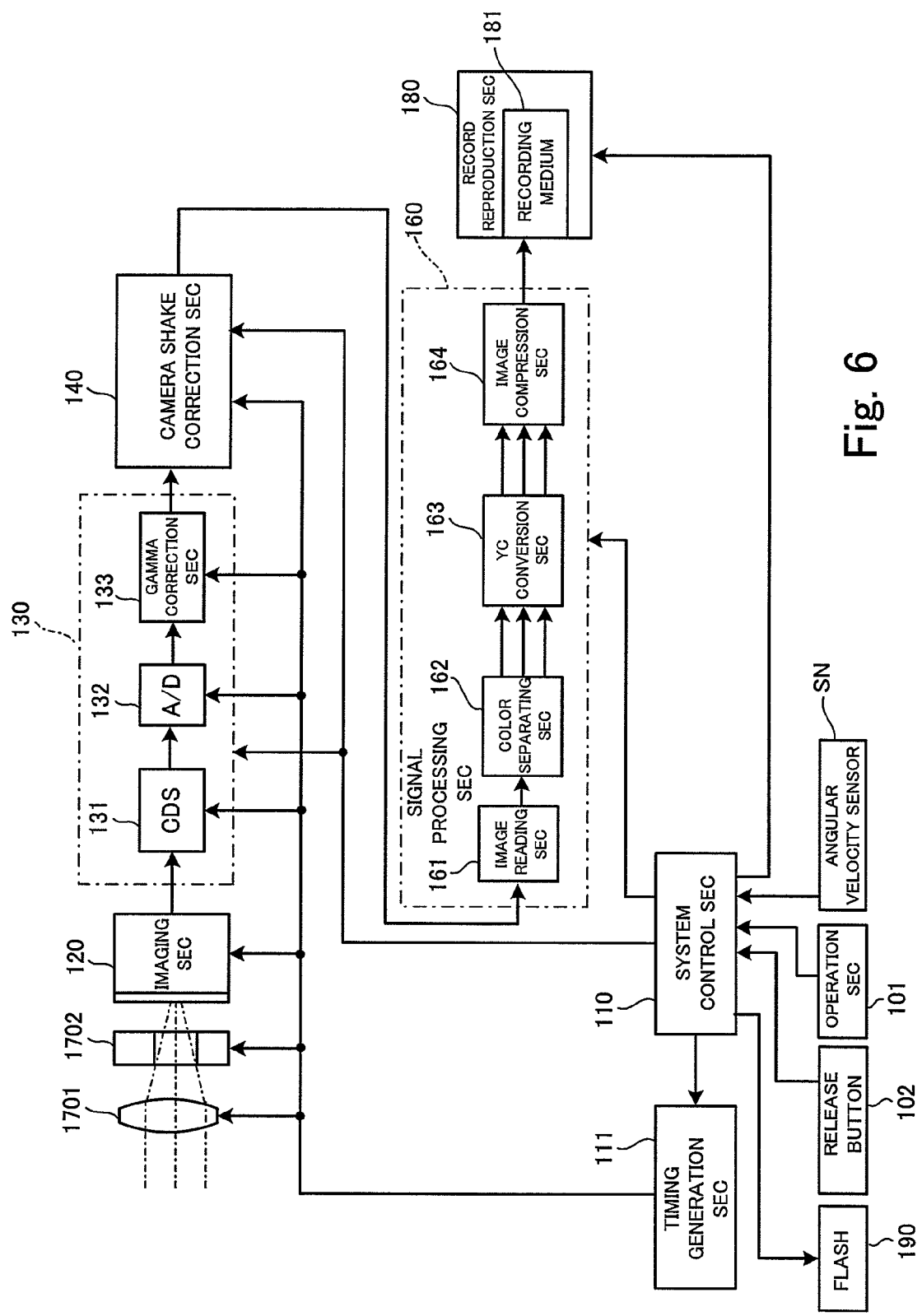
FIG. 6 is a diagram showing a third embodiment.
Figure 7:
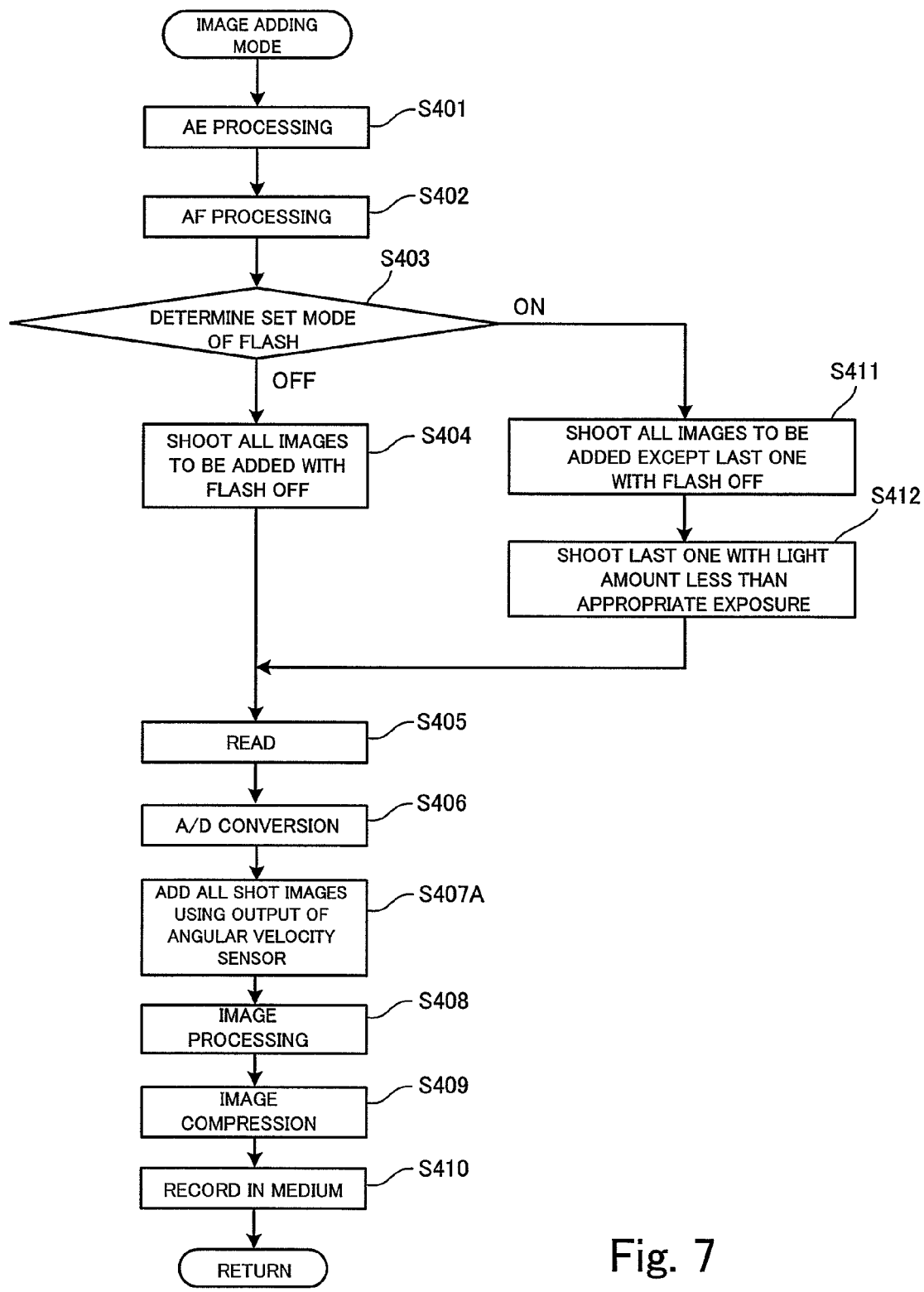
FIG. 7 is a diagram showing the third embodiment.

FIG. 6 and FIG. 7 are diagrams showing a third embodiment.

The configuration shown in FIG. 6 is same as FIG. 2 of the first embodiment except that an angular velocity sensor SN is added in FIG. 6. More specifically, in the third embodiment, blurring is offset in the address shift section 144 based on the amount of blurring that is calculated in the angular velocity sensor SN instead of the correlation arithmetic section 143 of FIG. 2, and the images are superimposed. Also, the process of the flow in FIG. 7 is same as that in FIG. 4 except that step S407 in FIG. 4 is changed to step S407A in FIG. 7 where blurring is corrected based on the amount of blurring detected in the angular velocity sensor.

The configuration of the third embodiment can achieve a similar effect to the first embodiment.

Figure 8:
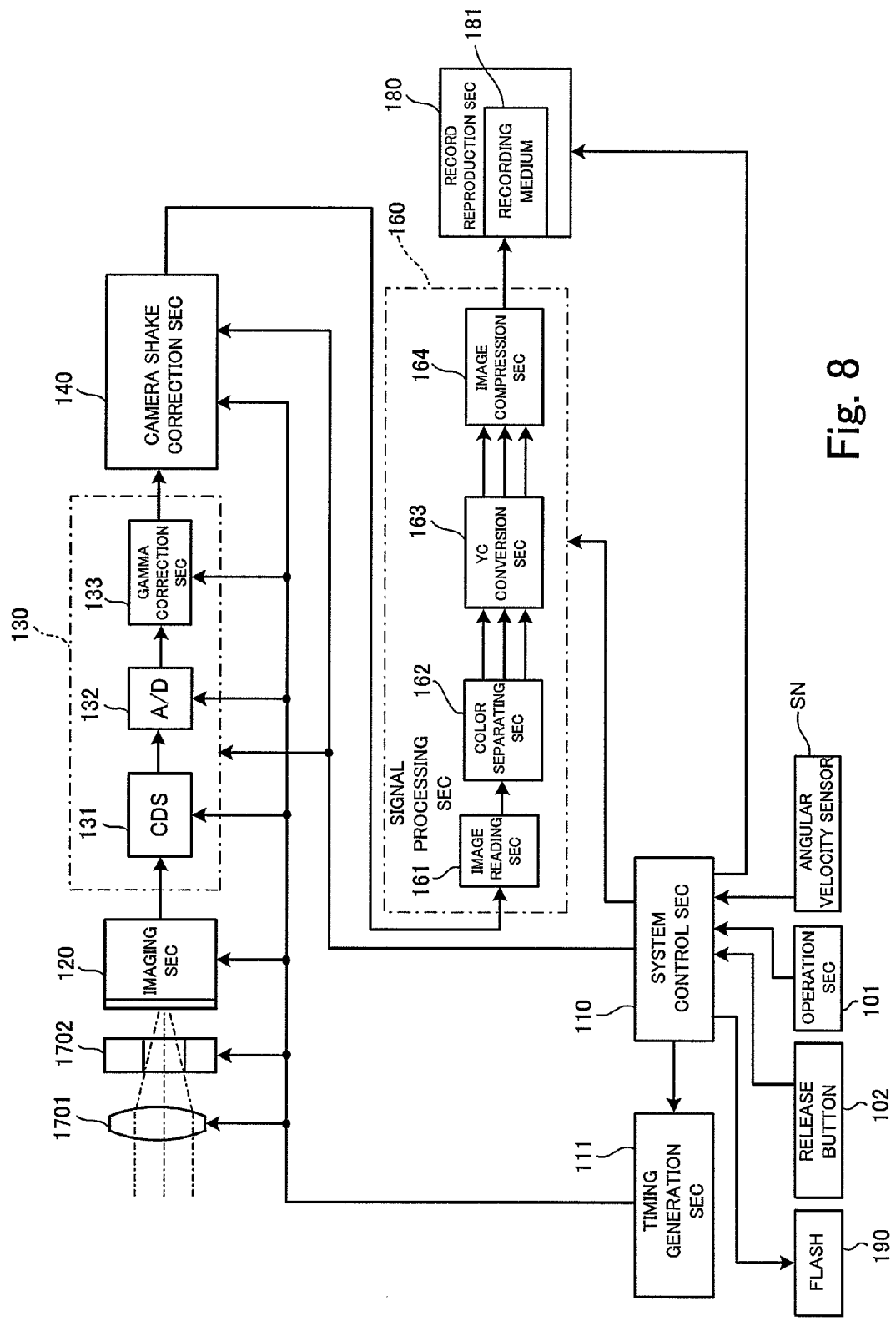
FIG. 8 is a diagram showing a fourth embodiment.
Figure 9:
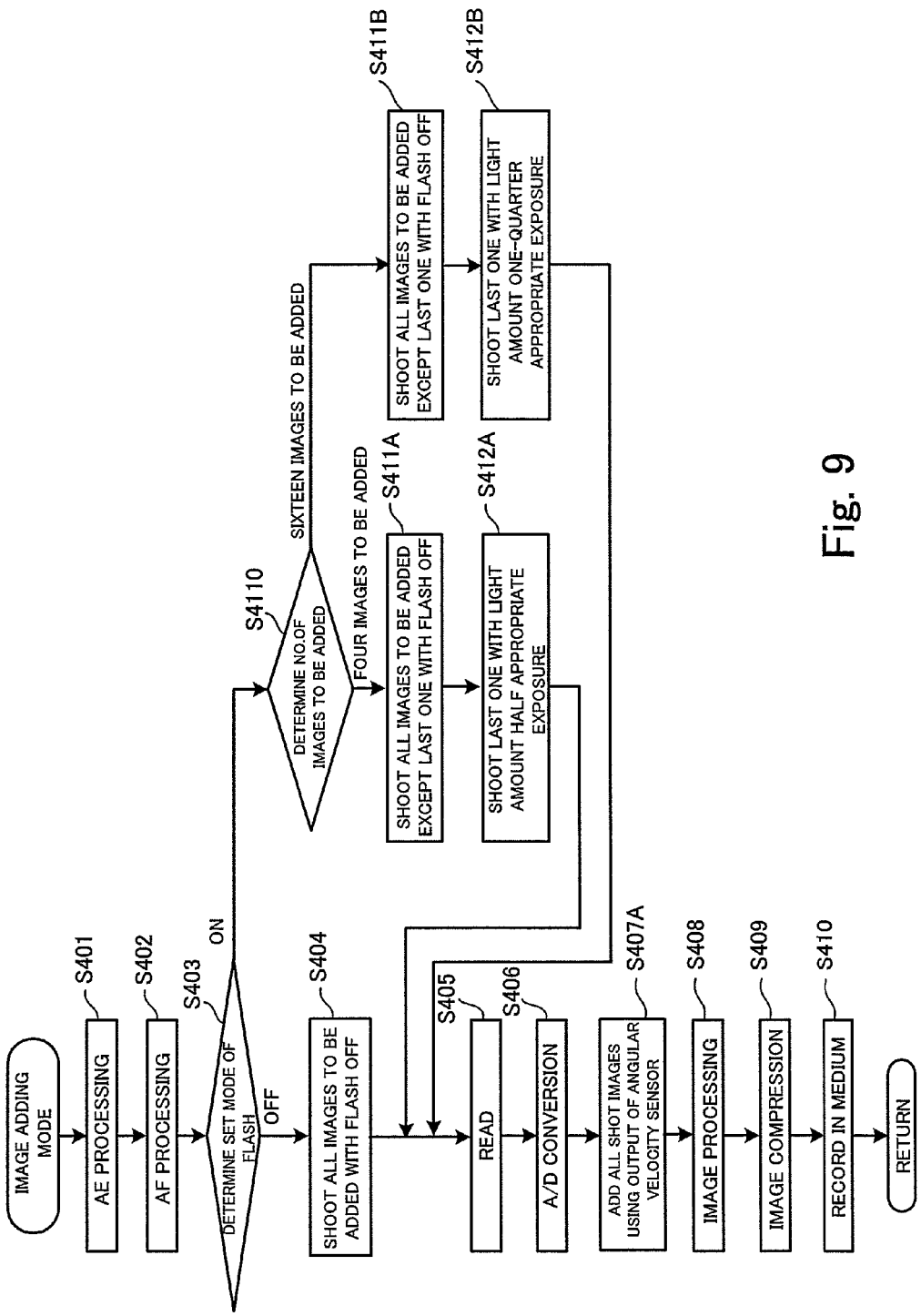
FIG. 9 is a diagram showing the fourth embodiment.

FIG. 8 and FIG. 9 are diagrams showing a fourth embodiment.

FIG. 8 has the same configuration as that of FIG. 6, and the flow of FIG. 9 is the same as the flow of the second embodiment shown in FIG. 5 except that the process of step S407 in FIG. 5 is changed to the process of step S407A in FIG. 9.

In the second embodiment, the number of images to be shot is set to either of four and sixteen in response to the operation and the amount of blurring is calculated in the correlation arithmetic section 143 provided in the camera shake correction section 140. The fourth embodiment is an example in which instead of the correlation arithmetic section 143 the angular velocity sensor SN is used for calculating the amount of blurring. Such a configuration may also be employed.

Figure 10:
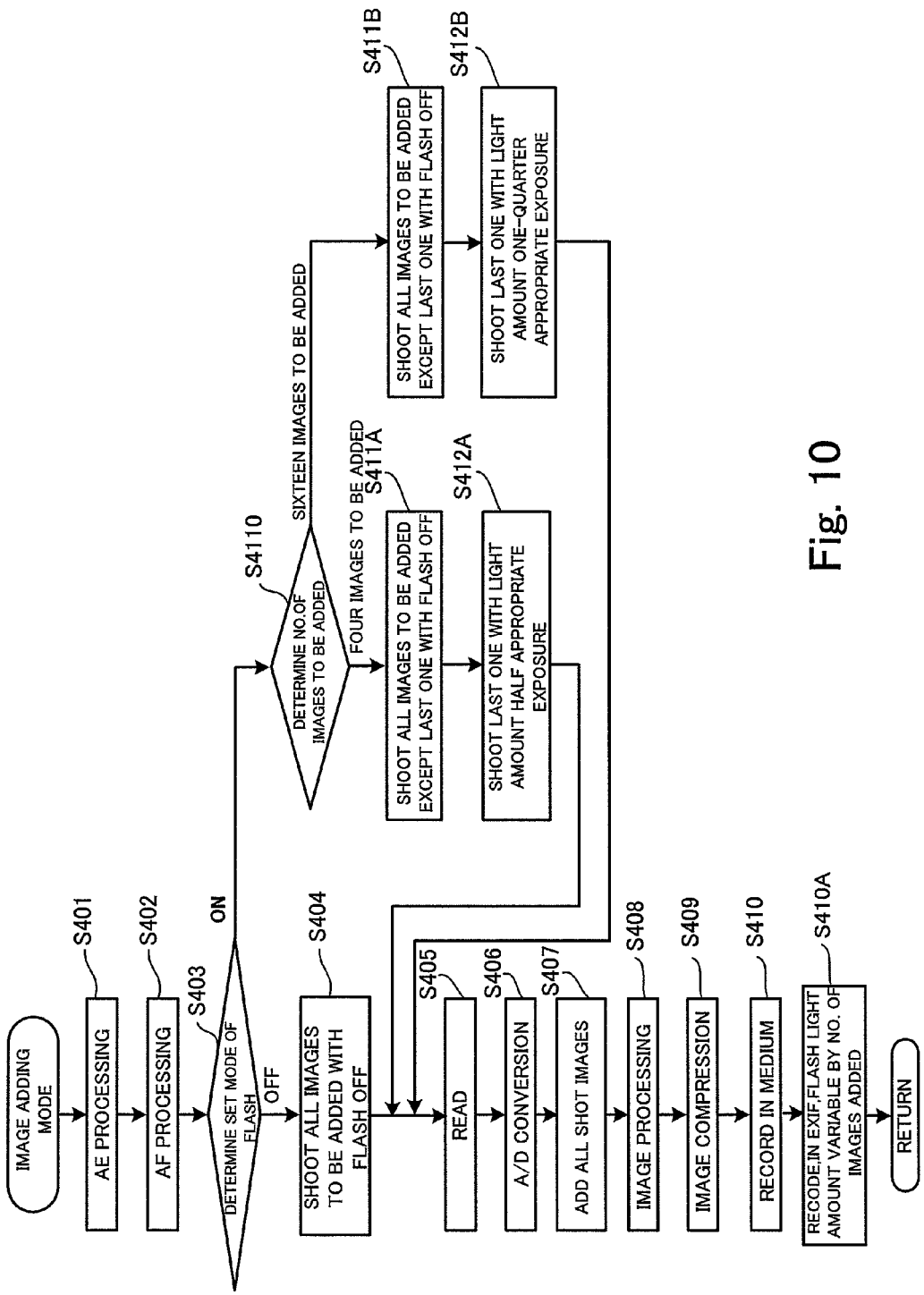
FIG. 10 is a diagram showing a fifth embodiment.
Figure 11:
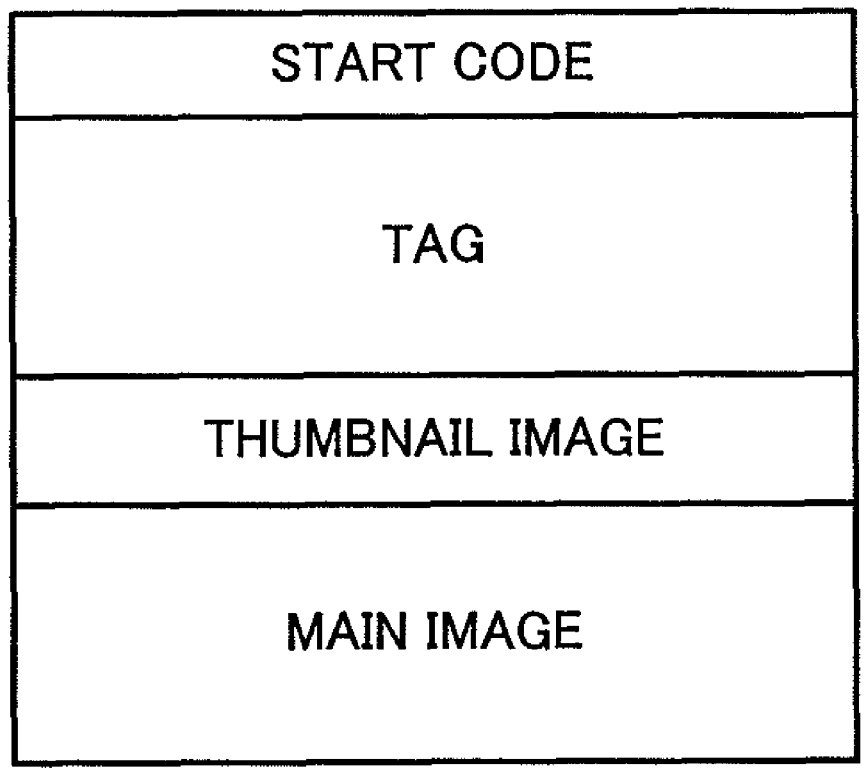
FIG. 11 is a diagram showing the fifth embodiment.

FIG. 10 and FIG. 11 are diagrams showing a fifth embodiment.

The process of flow in FIG. 10 is the same as the process of flow in FIG. 5 except that step S410A is added to FIG. 10. Also, a memory allocation in an Exif file is shown in FIG. 11.

The Exif file which is one form of an image file has plural memory regions inside thereof as shown in FIG. 11. The plural memory regions include a start code region, a tag region, a thumbnail image region, and a main image region in this order. If the tag region is made to record data representing the amount of light, the data can be read from the tag region to be displayed on the LCD 150 at the time of reproduction. Thus, the user can confirm on the display the amount of flash light that enables the user to obtain a bright image.

What is claimed is:

1. An image taking apparatus for forming a subject on an imaging device and thereby generating an image representing the subject, the image taking apparatus comprising:
    a flash that emits light, amount of which can be changed, to the subject at the time of shooting;
    a blurring correction section that superimposes a plurality of continuous images taken by one shooting operation and thereby generates one superimposed image in which blurring has been corrected;
    an image recording section that records the superimposed image generated by the blurring correction section; and
    a flash control section that causes the flash to emit light in sync with taking one image of the plurality of continuous images that are to be taken by one shooting operation, the light having such a light amount that results in underexposure of the taken one image.

2. The image taking apparatus according to claim 1, further comprising a number of images setting section that sets the number of images taken by one shooting operation,
    wherein the flash control section causes the flash to emit light in sync with taking one image of the plurality of continuous images that are taken by one shooting operation, the light having a smaller light amount as the number of images taken by one shooting operation is larger.

3. The image taking apparatus according to claim 1, wherein the flash control section causes the flash to emit light in sync with taking the last image of the plurality of continuous images that are to be taken by one shooting operation.

4. The image taking apparatus according to claim 2, wherein the flash control section causes the flash to emit light in sync with taking the last image of the plurality of continuous images that are to be taken by one shooting operation.

5. The image taking apparatus according to claim 1, further comprising a motion vector calculating section that calculates a motion vector based on the plurality of continuous images taken by one shooting operation,
    wherein the blurring correction section superimposes the plurality of continuous images so that blurring is corrected based on the motion vector calculated by the motion vector calculating section.

6. The image taking apparatus according to claim 2, further comprising a motion vector calculating section that calculates a motion vector based on the plurality of continuous images taken by one shooting operation,
    wherein the blurring correction section superimposes the plurality of continuous images so that blurring is corrected based on the motion vector calculated by the motion vector calculating section.

7. The image taking apparatus according to claim 1, further comprising an angular velocity sensor that detects the angular velocity of the image taking apparatus,
    wherein the blurring correction section superimposes the plurality of continuous images taken by one shooting operation so that blurring is corrected based on the angular velocity detected by the angular velocity sensor.

8. The image taking apparatus according to claim 2, further comprising an angular velocity sensor that detects the angular velocity of the image taking apparatus,
    wherein the blurring correction section superimposes the plurality of continuous images taken by one shooting operation so that blurring is corrected based on the angular velocity detected by the angular velocity sensor.

9. The image taking apparatus according to claim 1, wherein the image recording section records the superimposed image generated by the blurring correction section, by attaching to the superimposed image the amount of light that has been emitted in sync with taking one of images based on which the superimposed image is generated.

10. The image taking apparatus according to claim 2, wherein the image recording section records the superimposed image generated by the blurring correction section, by attaching to the superimposed image the amount of light that has been emitted in sync with taking one of images based on which the superimposed image is generated.

* * * * *